(12) United States Patent
Krishnan et al.

(10) Patent No.: US 7,886,183 B2
(45) Date of Patent: Feb. 8, 2011

(54) PROVIDING FAULT TOLERANT STORAGE SYSTEM TO A CLUSTER

(75) Inventors: Sasidharan Krishnan, Sunnyvale, CA (US); Suhas G. Urkude, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 323 days.

(21) Appl. No.: 12/187,859

(22) Filed: Aug. 7, 2008

(65) Prior Publication Data

US 2010/0037089 A1    Feb. 11, 2010

(51) Int. Cl.
G06F 11/00    (2006.01)

(52) U.S. Cl. .......................................................... 714/5
(58) Field of Classification Search ....................... 714/5
See application file for complete search history.

(56) References Cited

U.S. PATENT DOCUMENTS

| | | | |
|---|---|---|---|
| 6,446,219 B2 * | 9/2002 | Slaughter et al. ................ 714/4 |
| 7,246,256 B2 * | 7/2007 | De La Cruz et al. ............. 714/4 |
| 7,293,191 B1 | 11/2007 | Arumugham et al. |
| 7,467,258 B2 * | 12/2008 | Murayama ................... 711/114 |
| 7,565,568 B1 * | 7/2009 | Kumar et al. .................... 714/5 |
| 7,627,728 B1 * | 12/2009 | Roeck et al. ................. 711/162 |
| 7,669,077 B2 * | 2/2010 | Yamamoto et al. .............. 714/6 |
| 7,711,978 B1 * | 5/2010 | Roy et al. ........................ 714/4 |
| 7,770,059 B1 * | 8/2010 | Glade et al. ..................... 714/7 |
| 7,814,363 B2 * | 10/2010 | Hatta et al. ..................... 714/3 |
| 2006/0117215 A1 * | 6/2006 | Yanagisawa ................... 714/5 |
| 2007/0294563 A1 * | 12/2007 | Bose .............................. 714/5 |
| 2008/0126834 A1 * | 5/2008 | Sankaran et al. ................ 714/4 |
| 2008/0294933 A1 * | 11/2008 | Nishii et al. .................... 714/5 |
| 2009/0094603 A1 * | 4/2009 | Hiltgen et al. .................. 718/1 |
| 2009/0119538 A1 * | 5/2009 | Scales et al. .................... 714/6 |
| 2009/0138752 A1 * | 5/2009 | Graham et al. .................. 714/4 |
| 2009/0210875 A1 * | 8/2009 | Bolles et al. .................... 718/1 |

* cited by examiner

Primary Examiner—Robert Beausoleil
Assistant Examiner—Joshua P Lottich
(74) Attorney, Agent, or Firm—Lawrence J. Merkel; Meyertons, Hood, Kivlin, Kowert & Goetzel, P.C.

(57) ABSTRACT

In one embodiment, a system comprises a plurality of nodes. On each node, a storage virtualization component may receive the I/O operations generated from local applications on the node. The storage virtualization component may transmit the I/O operation, and detect any failures that occur in the I/O operations. If a failure is detected, the storage virtualization component may cooperate with other storage virtualization components on other nodes to successfully complete an I/O operation that experiences a failure. In one embodiment, if the I/O operation is successful on a remote node, the storage virtualization component may migrate the application that sourced the I/O operation to the remote node. In other embodiments, the storage virtualization component may monitor I/O operations and migrate the application after a pattern of local failures and successes on the remote node.

17 Claims, 7 Drawing Sheets

PROVIDING FAULT TOLERANT STORAGE SYSTEM TO A CLUSTER

BACKGROUND

1. Field of the Invention

This invention is related to virtual machines and storage systems used by the virtual machines.

2. Description of the Related Art

Virtual machines have a variety of uses in computer systems. For example, virtual machines are used to provide several users with concurrent access to a single physical computer system. Each user executes applications in a different virtual machine, and the virtual machines are scheduled for execution on the computer system hardware. The processing power of the computer system can be more effectively utilized by providing multiple virtual machines on the computer system. Additionally, user's activities are protected from the operation of other user's programs via the division into virtual machines. Virtual machines can also be used during software development to test the software on various hardware configurations (e.g. each hardware configuration is represented by a differently-configured virtual machine). Virtual machines can be used to consolidate tasks that were previously running on separate computer systems by assigning each task to a virtual machine and running the virtual machines on fewer computer systems. There are many other uses for virtual machines as well.

Because of their usefulness, virtual machines are being deployed more frequently across the computing spectrum. Additionally, the continued increase in processing power that is available on a single computer system (and especially on larger server systems) makes the overhead of the virtual machine less noticeable to the user, and permits more virtual machines to be executed on a single computer system.

Since a virtual machine encapsulates a given user's system state, virtual machines are portable from computer system to computer system (assuming that the computer systems are running the same or compatible virtual machine monitors that control the virtual machines). Accordingly, a highly available solution to supporting virtual machines may include a cluster of computer systems (referred to as nodes) executing virtual machines. A given node is executing a given virtual machine at any point in time, and the virtual machine can be failed over to another node if a failure is detected. Similarly, in a non-virtual machine environment, applications can be failed over to other nodes.

One type of failure that can occur is an input/output (I/O) failure to the storage device(s) used by the application. The I/O failure can occur due to a loss of connectivity to the storage device(s), due to failures in the storage device(s) themselves, and other reasons. The I/O failure is reported to the application, which attempts to recover from the failure.

SUMMARY

In one embodiment, a system comprises a plurality of nodes. On each node, a storage virtualization component is included that may receive the I/O operations generated from local applications on the node. The storage virtualization component may transmit the I/O operation, and detect any failures that occur in the I/O operations. If a failure is detected, the storage virtualization component may cooperate with other storage virtualization components on other nodes to successfully complete an I/O operation that experiences a failure. Specifically, the storage virtualization component for which the I/O operation is local may first attempt the I/O operation, and may detect the failure. The source storage virtualization component may select another node and transmit the I/O operation to the storage virtualization component on that node. The receiving storage virtualization component may attempt to perform the I/O operation (referred to as a "remote I/O operation" if it is originally sourced from another node) in a manner similar to a local I/O operation. If the operation completes successfully, the receiving storage virtualization component may indicate success to the source storage virtualization component. The source storage virtualization component may indicate that the I/O operation completed successfully. Thus, the application may be insulated from the failure, and may continue execution.

In one embodiment, if the I/O operation is successful on a remote node, the storage virtualization component may migrate the application that sourced the I/O operation to the remote node. In other embodiments, the storage virtualization component may monitor I/O operations and migrate the application after a pattern of local failures and successes on the remote node.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
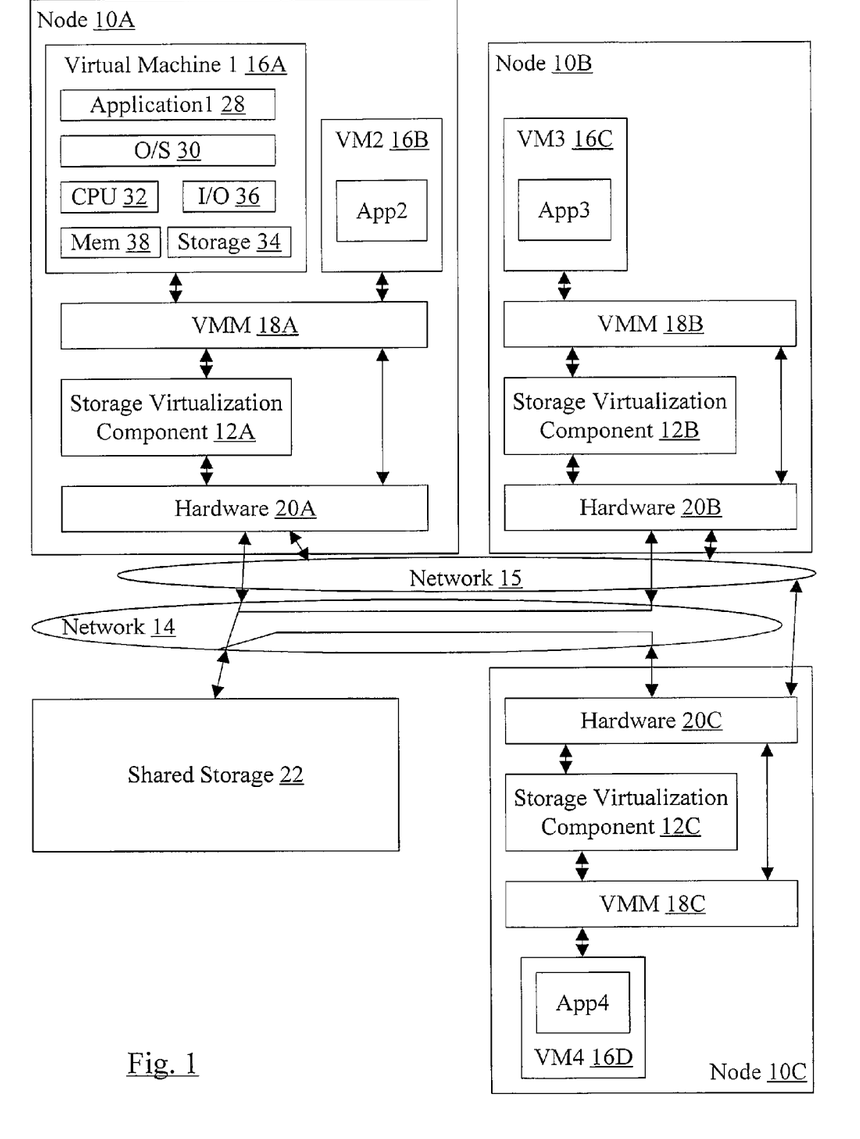
FIG. 1 is a block diagram of one embodiment of a system.

Turning now to FIG. 1, a block diagram of one embodiment of a system including a plurality of nodes 10A-10C and a shared storage device or devices (collectively "shared storage" or "storage") 22 coupled via a network 14. Additionally, nodes 10A-10C may communicate with each other via another network 15. Generally speaking, each node 10A-10C comprises a computer system.

In the illustrated embodiment, each node 10A-10C includes one or more virtual machines (e.g. virtual machines 16A-16D as illustrated in FIG. 1). The virtual machines are controlled by a virtual machine monitor (VMM) 18A-18C. Additionally, the nodes 10A-10C include a storage virtualization component 12A-12C. The storage virtualization components 12A-12C and the VMMs 18A-18C may comprise software and/or data structures. The software may be executed on the underlying hardware in the nodes 10A-10C (e.g. the hardware 20A-20C in each node 10A-10C). The hardware may include any desired circuitry. For example, the hardware may include one or more processors, or central processing units (CPUs), storage, and input/output (I/O) circuitry.

As shown in FIG. 1, each application executing on a given node 10A-10C executes within a virtual machine 16A-16D. Generally, a virtual machine comprises any combination of software, one or more data structures in memory, and/or one or more files stored on a storage device or devices (such as the storage 22). Under the control of the VMMs 18A-18C, the virtual machine mimics the hardware used during execution of a given application that is encapsulated by the virtual machine. For example, in the virtual machine 16A, an application 28 is shown. The application 28 is designed to execute on the operating system (O/S) 30. Both the application 28 and the O/S 30 are coded with instructions executed by the virtual CPU 32. Additionally, the application 28 and/or the O/S 30 may make use of virtual memory 38, one or more virtual storage devices 34, and virtual input/output (I/O) devices 36. The virtual memory 38 may be mapped by the VMM 18A-18C to physical memory locations in the hardware 20A-20C (e.g. in a memory system, typically comprising dynamic random access memory (DRAM) including synchronous DRAM (SDRAM), double data rate DRAM (DDR DRAM, DDR2 DRAM, DDR3 DRAM), etc. The virtual I/O devices may mimic any type of I/O devices, including modems, audio devices, video devices, network interface controller (NICs), universal serial bus (USB) ports, firewire (IEEE 1394) ports, serial ports, parallel ports, etc. Generally, each virtual I/O device may be mapped to a corresponding I/O device in the underlying hardware 20A-20C or may be emulated in software (e.g. the VMMs 18A-18C) if no corresponding I/O device is included in the underlying hardware.

The virtual storage may mimic any type of storage, such as disk storage, tape storage, etc. The disk storage may be any type of disk (e.g. fixed disk, removable disk, compact disc read-only memory (CD-ROM), rewriteable or read/write CD, digital versatile disk (DVD) ROM, etc.). Each virtual disk storage in the virtual machine may be mapped to a file on a storage device such as the storage 22. Alternatively, each virtual disk storage may be mapped directly to a physical storage device, or a combination of direct mappings and file mappings may be used. The mapping of virtual storage 34 to the shared storage 22 may be managed by the storage virtualization components 12A-12C. In general, the storage virtualization components 12A-12C may handle the allocation of storage space in the storage 22 and may expose the storage to the other programs (e.g. virtual machines 16A-16C) in a fashion that is useable by the other programs. In one embodiment, for example, the storage virtualization components 12A-12C may comprise a volume manager that establishes volumes on the storage 22. The volumes may be exposed as logical unit numbers (LUNs) to the virtual machines, and thus one or more LUNs may form the virtual storage 34. In other embodiments, the storage virtualization component 12A-12C may be a file system or any other program configured to manage storage and provide access to the storage by other programs.

Generally, the application 28 and/or O/S 30 may generate I/O operations to the virtual storage 34. An I/O operation may be any communication to the virtual storage 34. For example, a read I/O operation may be a request to read data from the virtual storage 34. A write I/O operation may be a request to write data to the virtual storage 34. Both read and write operations may include an address (according to the interface with the virtual storage 34), and the write operation may include data. Other I/O operations may include various commands, etc., from the application 28 and/or O/S 30 to the virtual storage 34.

The storage virtualization components 12A-12C may receive the I/O operations generated from their local virtual machines (i.e. the virtual machines on the same node as the storage virtualization components 12A-12C). I/O operations from local virtual machines may be referred to as local I/O operations, herein. The storage virtualization components 12A-12C may modify the operations, if needed, for transmission to the storage 22. Additionally, the storage virtualization components 12A-12C may detect any failures that may occur in the I/O operations. Generally, a failure in the I/O operation may be any event that prevents the I/O operation from completing without error. The failure may arise due to a loss of connectivity with the storage 22, failures within the storage 22, errors in the transmission (e.g. bit errors introduced by noise or other failure), errors signaled by the storage 22, expiration of a timeout without a response, etc.

The storage virtualization components 12A-12C may cooperatively attempt to successfully complete an I/O operation that experiences a failure. Specifically, the storage virtualization component for which the I/O operation is local may first attempt the I/O operation, and may detect a failure. The local storage virtualization component (or the "source storage virtualization component") may select another node and transmit the I/O operation to the storage virtualization component 12A-12C on that node. Transmitting the I/O operation between storage virtualization components may also be referred to herein as shipping the I/O operation. The receiving storage virtualization component 12A-12C may attempt to perform the I/O operation (referred to as a "remote I/O operation" if it is originally sourced from another node) in a manner similar to a local I/O operation. If the operation completes successfully, the receiving storage virtualization component 12A-12C may indicate success to the source storage virtualization component 12A-12C (and may return any other data, such as read data, to the source storage virtualization component 12A-12C). The source storage virtualization component 12A-12C may indicate that the I/O operation completed successfully to the source application in the source virtual machine 16A-16D, which may thus be insulated from the error. If the I/O operation fails on the remote node, the source storage virtualization component 12A-12C may select additional nodes until either the I/O operation succeeds or the I/O operation has been attempted by each node. If the I/O operation fails at each node, then the failure may be reported to the source application (in the source virtual machine 16A-16D) for handling.

While various mechanisms may be used to select the receiving storage virtualization component 12A-12C, in general any node 10A-10C may be eligible to be selected. In some embodiments, a subset of nodes may be available to be selected at any given time (e.g. because other nodes are too busy to attempt the I/O operation, other nodes are down, etc.).

The storage virtualization component 12A-12C may select from the available subset in such cases.

By attempting a failed I/O operation from another node, some failures may be overcome. For example, the transmission of the I/O operation from different nodes 10A-10C to the storage 22 may involve different paths. If the failure is related to a path that is not traversed from a remote node 10A-10C to the storage 22, then attempting the I/O operation from the remote node may result in success. In FIG. 1, the path from various nodes 10A-10C through the network 14 to the storage 22 is illustrated as lines within the network 14. The paths may join (e.g. the paths from nodes 10A-10B to the storage 22 may be partially shared, illustrated by their respective lines within the network 14 joining in FIG. 1). Other paths may be completely independent (e.g. the path from the node 10C to the storage 22 in FIG. 1 is independent of the paths from the nodes 10A-10B in FIG. 1). Any combination of independent, completely shared, and partially shared paths may be provided in various embodiments.

In one embodiment, if the I/O operation is successful on a remote node 10A-10C, the storage virtualization component may migrate the virtual machine 16A-16D including the application that sourced the I/O operation to the remote node. In other embodiments, the storage virtualization component may monitor I/O operations and migrate the application after a pattern of local failures and successes on the remote node. Thus, transient errors may not cause a virtual machine to migrate but sustained errors will cause the virtual machine to migrate to a node that is having success completing the I/O operations. By migrating the virtual machine 16A-16D to the remote node 10A-10C that is having success completing the I/O operations sourced by the virtual machine 16A-16D, the latency of having the local I/O operation fail and communication with the remote node/nodes may by avoided.

It is noted that, while the present embodiment describes applications executing in virtual machines, other embodiments may implement the storage virtualization components, shipping failed I/O operations therebetween, and migrating applications that are not in virtual machines. For example, a highly available (HA) cluster of nodes that uses cluster server software to failover applications between nodes may implement the storage virtualization components 12A-12C on each node. The cluster server may failover the application to a node (at which I/O operation failures from the current node are succeeding). The node to which the failover is to occur is indicated by the storage virtualization components 12A-12C in this case, based on the results of performing the I/O operations on other nodes. At various points in the remainder of this disclosure, the virtual machine embodiments are described as an example. However, HA clusters may similarly be used.

Accordingly, migrating an application from a source node to a target node may generally include causing the application to be executed on the target node and ceasing its execution on the source node. For example, the virtual machine including the application may be migrated, or the application may be failed over by cluster server software.

The virtual machine in which an application is executing encapsulates the application (and its O/S) and encompasses the entire system state associated with the application. Generally, when a virtual machine is active (i.e. the application within the virtual machine is executing on the hardware 20A-20C), the virtual machine may be stored in the memory of the computer system on which the virtual machine is executing (although the VMM may support a paging system in which various pages of the memory storing the virtual machine may be paged out to local storage in the computer system) and in the files which are mapped to the virtual storage devices in the virtual machine. The VMM may support a command to suspend the virtual machine. In response to the command, the VMM may write an image of the virtual machine to storage, capturing the current state of the virtual machine and thus implicitly capturing the current state of the executing application (e.g. the state of the virtual CPU 32, the state of the virtual memory 38, etc.). Thus, the image may be a snapshot of the state of the executing application. A suspended virtual machine may be resumed using a resume command supported by the VMM. In response to the resume command, the VMM may read the image of the suspended virtual machine from the storage device and may activate the virtual machine in the computer system. Accordingly, in one embodiment, migrating an application in a virtual machine from a source node to a target node may comprise suspending the virtual machine (e.g. to the shared storage 22) on the source node and resuming the virtual machine on the target node.

The virtual hardware in the virtual machine 16A (and other virtual machines such as the virtual machines 16B-16D) may be similar to the hardware 20A-20C included in the node 10A-10C. For example, the virtual CPU 32 may implement the same instruction set architecture as the processor(s) in the hardware 20A-20C. In such cases, the virtual CPU 32 may be one or more data structures storing the processor state for the virtual machine 16A. The application and O/S software instructions may execute on the CPU(s) in the hardware 20A-20C when the virtual machine 16A is scheduled for execution by the VMM 18A. When the VMM 18A schedules the virtual machine 16A for execution, the VMM 18A may load the virtual CPU state 32 into the hardware CPU. Similarly, when the VMM 18A stops the virtual machine 16A to schedule another virtual machine for execution (e.g. the virtual machine 16B), the VMM 18A may write the state of the processor into the virtual CPU 32 data structure. Alternatively, the virtual CPU 32 may be different from the CPU(s) in the hardware 20A-20C. For example, the virtual CPU 32 may comprise software coded using instructions from the instruction set supported by the underlying CPU to emulate instruction execution according to the instruction set architecture of the virtual CPU 32. Alternatively, the VMM 18 may emulate the operation of the hardware in the virtual machine. Similarly, any virtual hardware in a virtual machine may be emulated in software if there is no matching hardware in the hardware 20A-20C.

Different virtual machines which execute on the same computer system 10 may differ. For example, the O/S 30 included in each virtual machine may differ. Different virtual machines may employ different versions of the same O/S (e.g. Microsoft Windows NT with different service packs installed), different versions of the same O/S family (e.g. Microsoft Windows NT and Microsoft Windows2000), or different O/Ss (e.g. Microsoft Windows NT, Linux, Sun Solaris, etc.). Other versions of Microsoft Windows may also be used (e.g. XP, Vista, server versions, etc.).

Generally, the VMM 18A-18C may be responsible for managing the virtual machines on a given computer system. The VMM 18A-18C may schedule virtual machines for execution on the underlying hardware, using any scheduling scheme. For example, a time division multiplexed scheme may be used to assign time slots to each virtual machine. Additionally, the VMM 18A-18C may handle the suspending and resuming of virtual machines responsive to suspend and resume commands. The commands may be received from a virtual machine, or may be communicated from another computer system. In one embodiment, the VMM 18A-18C may be the ESX product available from VMware, Inc. (Palo Alto, Calif.). Other embodiments may include the Xen virtual machine monitor available as freeware, virtual machine monitors available from Microsoft, Inc., etc.

In one embodiment, the VMM 18A-18C may be a hypervisor implementation that controls the virtual machines and executes on a host operating system. For example, the GSX product available from VMware, Inc. may execute under various versions of Microsoft's Windows operating system and/or the Linux operating system. In one embodiment, the storage virtualization components may execute in a control area of the VMM 18A-18C, which may be provided with more trusted control of the nodes than the programs executing in the virtual machines. For example, in the VMware products, the storage virtualization components may execute in the control domain. In Xen, the storage virtualization components may execute in dom0.

The storage 22 may be any type of storage device to which the nodes 10A-10C may be coupled. For example, network attached storage (NAS) or storage area network (SAN) technologies may be used. The storage devices within the shared storage 22 may comprise one or more fixed disk drives such as integrated drive electronics (IDE) drives, small computer system interface (SCSI) drives, etc. Generally, a storage device is any device which is capable of storing data. The network 14 may provide storage connectivity and may thus be any network capable of transmitting I/Os to storage and responses from storage. For example, the network may be SAN, NAS, etc. The network 15 may be the network used for communication among the nodes (e.g. Ethernet, Infiniband, Token Ring, etc.). The I/O requests may be shipped between storage virtualization components over the network 15, in one embodiment. Additionally, other communications between the storage virtualization components may be performed over the network 15.

It is noted that, while each virtual machine illustrated in FIG. 1 includes one application, generally a virtual machine may include one or more applications. For example, in one embodiment a user may execute all applications which execute on the same underlying O/S 30 in the same virtual machine.

It is noted that the term "program", as used herein, refers to a set of instructions which, when executed, perform the function described for that program. The instructions may be machine level instructions executed by a CPU, or may be higher level instructions defined in a given higher level language (e.g. shell scripts, interpretive languages, etc.). The term "software" may be synonymous with "program".

Turning now to FIGS. 2-5, various examples of performing an I/O operation for an application is illustrated in block diagram form. A simplified block diagram illustrating only the source application 28 in the node 10A and the storage virtualization components 12A-12C in the nodes 10A-10C, respectively, is shown. In various embodiments, the source application 28 may be encapsulated in a virtual machine 16A-16D and there may be VMMs 18A-18C executing on each node, or the application may be monitored by a cluster server for possible failover.

Figure 2:
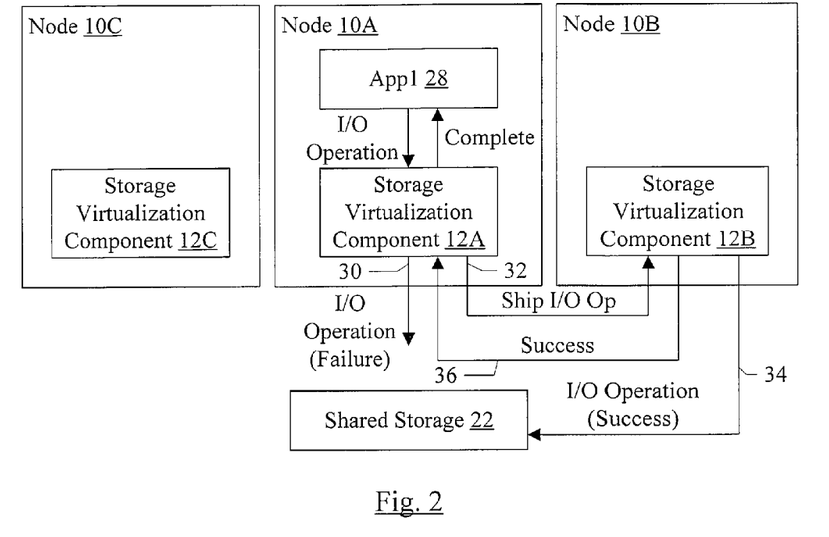
FIG. 2 is a block diagram of one example of providing input/output (I/O) operation for an application in a virtual machine.

In FIG. 2, the application 28 is executing on the node 10A and issues an I/O operation that is mapped to the shared storage 22. The storage virtualization component 12A on the node 10A transmits a corresponding I/O operation on the network 14 (arrow 30). The storage virtualization component 12A detects a failure of the I/O operation. For example, the storage virtualization component 12A may detect a timeout without a response to the I/O operation, receive an error indication from the storage 22, detect an error in the response, etc. The storage virtualization component 12A selects the node 10B as a receiving node for the I/O operation, and ships the I/O operation to the storage virtualization component 12B on the node 10B (arrow 32). The storage virtualization component 12B receives the remote I/O operation and transmits the remote I/O operation on the network 14 (arrow 34). The remote I/O operation succeeds. The storage virtualization component 12B transmits an indication of success to the storage virtualization component 12A (arrow 36), and may also return any data related to the I/O operation to the storage virtualization component 12A (e.g. read data from the storage 22, for a read I/O operation). The storage virtualization component 12A may report that the operation completed successfully to the application 28 (and may pass any other data to the application 28 as well).

Accordingly, in the example of FIG. 2, the failure of the I/O operation may be effectively transparent. Other than an increase in latency due to the actual failure from the node 10A and the communication with the node 10B to successfully complete the I/O operation, the application 28 may not be "aware" of the failure.

Figure 3:
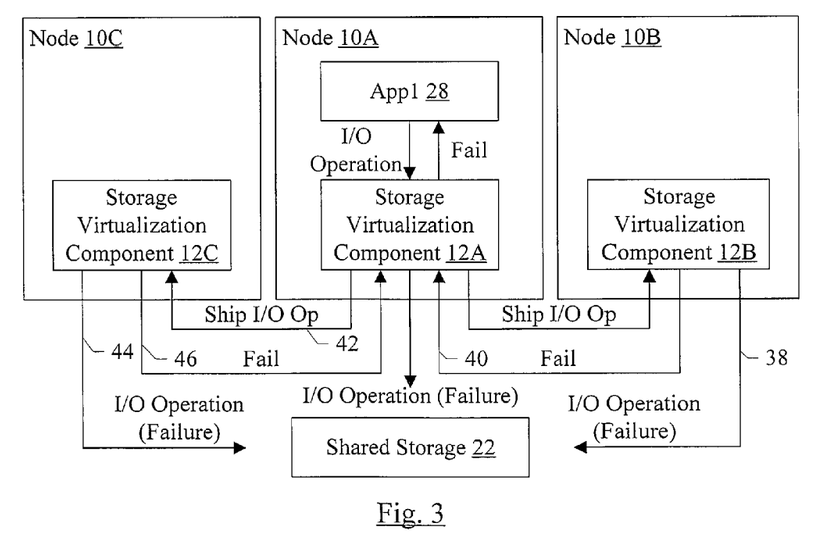
FIG. 3 is a block diagram of a second example of providing input/output (I/O) operation for an application in a virtual machine.

FIG. 3 is another example. Like FIG. 2, the application 28 may issue the I/O operation, the storage virtualization component 12A transmits the corresponding I/O operation on the network 14, the storage virtualization component 12A detects the failure of the I/O operation, and ships the I/O operation to the storage virtualization component 12B. The storage virtualization component 12B on the node 10B receives the remote I/O operation and transmits the remote I/O operation on the network 14 (arrow 38). In this example, the storage virtualization component 12B detects that the remote I/O operation fails and transmits an indication of the failure to the storage virtualization component 12A (arrow 40).

In response to the failure from the node 10B, the storage virtualization component 12A selects another node (the node 10C) to attempt the I/O operation. The storage virtualization component ships the I/O operation to the storage virtualization component 12C (arrow 42). The storage virtualization component 12C receives the remote I/O operation, and transmits the remote I/O operation on the network 14 (arrow 44). The storage virtualization component 12C also detects that the remote I/O operation fails, and signals the failure to the storage virtualization component 12A (arrow 46). The storage virtualization component 12A determines that no more nodes are available to attempt the I/O operation, and reports the failure to the application 28. The application 28 may handle the failure in an implementation dependent fashion.

Figure 4:
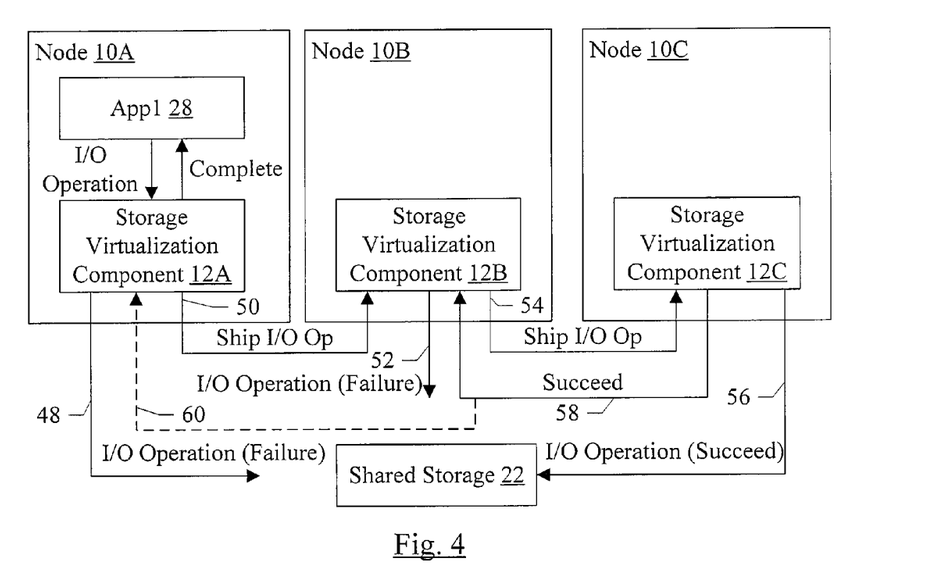
FIG. 4 is a block diagram of a third example of providing input/output (I/O) operation for an application in a virtual machine.

While FIG. 3 illustrates an example in which the source storage virtualization component 12A may ship the I/O operation to each selected node and receive the failure indication. Other embodiments may ship the I/O operation from node to node, until either success is determined or the nodes are exhausted. FIG. 4 is an example of one such configuration.

In FIG. 4, the storage virtualization component 12A receives the I/O operation from the application 28 and transmits a corresponding I/O operation on the network 14 (arrow 48). The storage virtualization component detects that the I/O operation fails, and ships the I/O operation to the storage virtualization component 12B (arrow 50). The storage virtualization component 12B on the node 10B receives the remote I/O operation, and transmits the remote I/O operation on the network 14 (arrow 52). The storage virtualization component 12B also detects that the I/O operation fails. Instead of returning the failure indication to the storage virtualization component 10A, the storage virtualization component 12B selects the node 10C to attempt the I/O operation, and ships the I/O operation to the storage virtualization component 12C (arrow 54). The storage virtualization component 12C receives the remote I/O operation from the node 10B, and transmits the remote I/O operation on the network 14. The I/O operation from the node 10C succeeds (arrow 56), and the storage virtualization component 12C signals success to the storage virtualization component 12B (arrow 58). In other embodiments, the storage virtualization component 12C may also signal success to the storage virtualization component 12A (dotted arrow 60), or may signal the storage virtualization component 12A instead of the storage virtualization component 12B. If the storage virtualization component 12C does not signal the storage virtualization component 12A, the storage virtualization component 12B may signal the storage virtualization component 12A. Failure indications may similarly be signaled back to the source node or through intervening nodes. While three nodes are shown in FIGS. 3 and 4, any number of nodes may be included in other embodiments.

Figure 5:
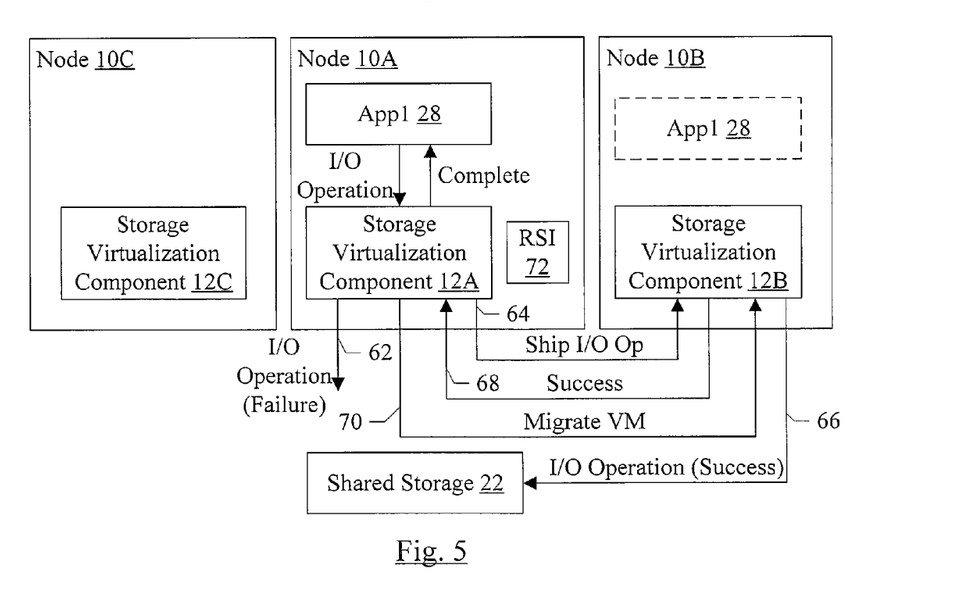
FIG. 5 is a block diagram of a fourth example of providing input/output (I/O) operation for an application in a virtual machine.

As mentioned previously, in some embodiments, the source storage virtualization component 12A-12C may migrate the application to a node from which the I/O operation succeeds. FIG. 5 is an example. In FIG. 5, the application 28 is initially executing in the node 10A. The application 28 issues an I/O operation, and the storage virtualization component 12A transmits a corresponding I/O operation on the network 14 (arrow 62). The I/O operation fails, and so the storage virtualization component 12A selects the node 10B and ships the I/O operation to the storage virtualization component 12B (arrow 64). The storage virtualization component 12B receives the remote I/O operation, and successfully transmits the remote I/O operation to the storage 22 (arrow 66). The storage virtualization component 12B reports the success of the I/O operation to the storage virtualization component 12A (arrow 68). In response, the storage virtualization component 12A migrates the virtual machine 16A encapsulating the application 28 to the node 10B (arrow 70). Subsequently, the virtual machine 16A (and the application 28) may execute on the node 10B thereafter (illustrated in dashed form on the node 10B).

As mentioned previously, the storage virtualization component 12A may not migrate the virtual machine in response to the first local I/O operation failure and success of that operation on a remote node. The storage virtualization component 12A may record the success of I/O operations from local virtual machines on remote nodes using one or more remote success indictors (RSI) 72. The RSI 72 may record success in any fashion. For example, an indication of the remote node that is having success may be recorded. A count of the number of successful I/O operations on the remote node may be recorded. Any indicator or indicators may be used. In one embodiment, there may be one RSI 72 for each application (or virtual machine) executing on the node. In another embodiment, there may be one RSI 72 for each application/virtual machine and each virtual storage device in the virtual machine (e.g. if different storage devices in the storage 22 are used for the different virtual storage devices, different nodes may have success for local I/O operation failures to the different virtual storage devices). In such embodiments, the storage virtualization component 12A may migrate the application/virtual machine based on the RSI 72 in addition to the success of the most recent I/O operation on the remote node.

Figure 6:
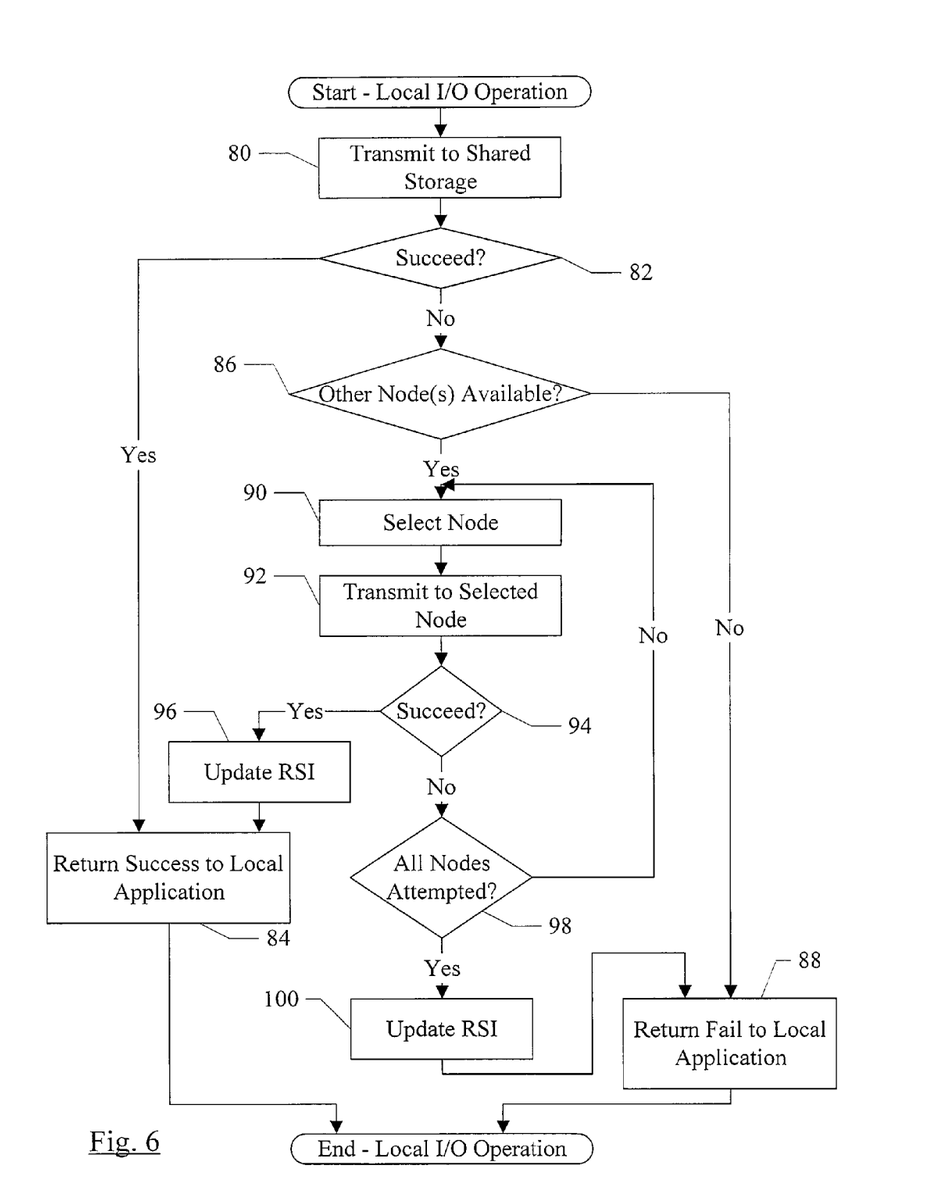
FIG. 6 is a flowchart illustrating operation of one embodiment of storage virtualization component in response to a local I/O operation.

Turning now to FIG. 6, a flowchart is shown illustrating operation of one embodiment of the storage virtualization components 12A-12C in response to a local I/O operation (that is, an I/O operation sourced by an application/virtual machine on the same node as the storage virtualization component 12A-12C). The storage virtualization component 12A-12C may include instructions which, when executed on the node, implement the operation illustrated in FIG. 6. While blocks are shown in a particular order for ease of understanding, other orders may be used.

The storage virtualization component 12A-12C may transmit an I/O operation to the storage 22 (over the network 14—block 80). In one embodiment, the I/O operation may be the same as the local I/O operation issued by the application/virtual machine. In other embodiments, the storage virtualization component 12A-12C may translate the local I/O operation to the transmitted I/O operation. If the transmitted I/O operation succeeds (decision block 82, "yes" leg), the storage virtualization component 12A-12C may report success to the local application/virtual machine (along with any other operation-specific data that the application/virtual machine is expecting) and the operation is complete (block 84).

If the transmitted I/O operation does not succeed (decision block 82, "no" leg), the storage virtualization component 12A-12C may determine if any other nodes are available to attempt the I/O operation (decision block 86). In general, any node executing the storage virtualization component 12A-12C may be eligible to attempt the I/O operation. However, in some cases, only a subset may be available. If other nodes are not available (decision block 86, "no" leg), the storage virtualization component 12A-12C may return fail to the application/virtual machine (block 88). The application/virtual machine may handle the failure of the I/O operation in an implementation-specific fashion.

If other nodes are available (decision block 86, "yes" leg), the storage virtualization component 12A-12C may select a node from among the available nodes (block 90). Any selection mechanism may be used. For example, a random selection may be made. Alternatively, if a failed I/O operation has previously succeeded on another node (e.g. as indicated by the RSI), the storage virtualization component 12A-12C may select the succeeding node. The other nodes may be listed in the order of preference for selection, and the storage virtualization component 12A-12C may select the most preferred among the available nodes. The preferred order may be different for each node, e.g. based on the relative distance/latency to other nodes, to balance the remote I/O operations made to each node, etc. Any combination of the above mechanisms and/or other mechanisms may be used.

The storage virtualization component 12A-12C may transmit the I/O operation to the selected node (block 92). If the I/O operation succeeds on the selected node (decision block 94, "yes" leg), the storage virtualization component 12A-12C may update the RSI to reflect the success (block 96). For example, if the RSI records an indication the successful node, the storage virtualization component 12A-12C may update the RSI to indicate the node that succeeded. If the RSI indicates a count of successful remote I/O operations, the count may be incremented. In other embodiments, instead of updating the RSI, the application/virtual machine may be migrated to the node at which the I/O operation succeeded. The storage virtualization component 12A-12C may also return success to the local application/virtual machine (block 84).

If the I/O operation does not succeed on the other node (decision block 94, "no" leg), and there are still available nodes remaining to be attempted (decision block 98, "no" leg), the storage virtualization component 12A-12C may return to select from among the remaining nodes and repeat the attempt on the newly selected node (block 90). If all available nodes have been attempted (decision block 98, "yes" leg), the storage virtualization component 12A-12C may update the RSI to indicate failure (block 100). For example, if the RSI includes a count of successful remote I/O operations, the RSI may be decremented (or set to zero). The storage virtualization component 12A-12C may also return fail to the local application/virtual machine (block 88).

It is noted that, at each point where an I/O operation has been transmitted to the storage or shipped to another node and the storage virtualization component 12A-12C is waiting for success or failure (e.g. decision blocks 82 and 94), the storage virtualization component 12A-12C may "go to sleep" and await rescheduling when the success/failure of the I/O operation is known.

Figure 7:
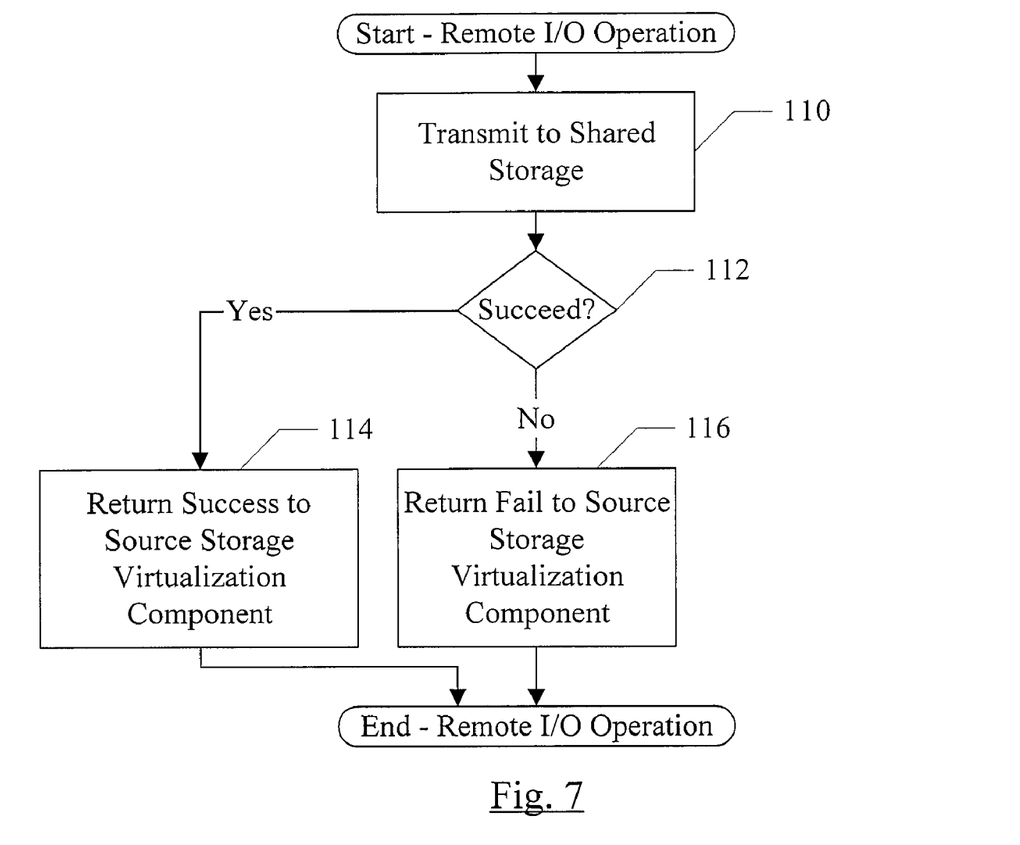
FIG. 7 is a flowchart illustrating operation of one embodiment of storage virtualization component in response to a remote I/O operation.

Turning next to FIG. 7, a flowchart is shown illustrating operation of one embodiment of the storage virtualization components 12A-12C in response to a remote I/O operation (that is, an I/O operation received from the storage virtualization component 12A-12C on another node). The storage virtualization component 12A-12C may include instructions which, when executed on the node, implement the operation illustrated in FIG. 7. While blocks are shown in a particular order for ease of understanding, other orders may be used.

The storage virtualization component 12A-12C may transmit the remote I/O operation to the storage 22 (over the network 14—block 110). If the transmitted I/O operation succeeds (decision block 112, "yes" leg), the storage virtualization component 12A-12C may report success to the source storage virtualization component 12A-12C (along with any other operation-specific data that the application/virtual machine is expecting) (block 114). If the remote I/O operation does not succeed (decision block 112, "no" leg), the storage virtualization component 12A-12C may report fail to the source storage virtualization component 12A-12C (block 116).

It is noted that, at each point where an I/O operation has been transmitted to the storage or shipped to another node and the storage virtualization component 12A-12C is waiting for success or failure (e.g. decision block 110), the storage virtualization component 12A-12C may "go to sleep" and await rescheduling when the success/failure of the I/O operation is known.

Figure 8:
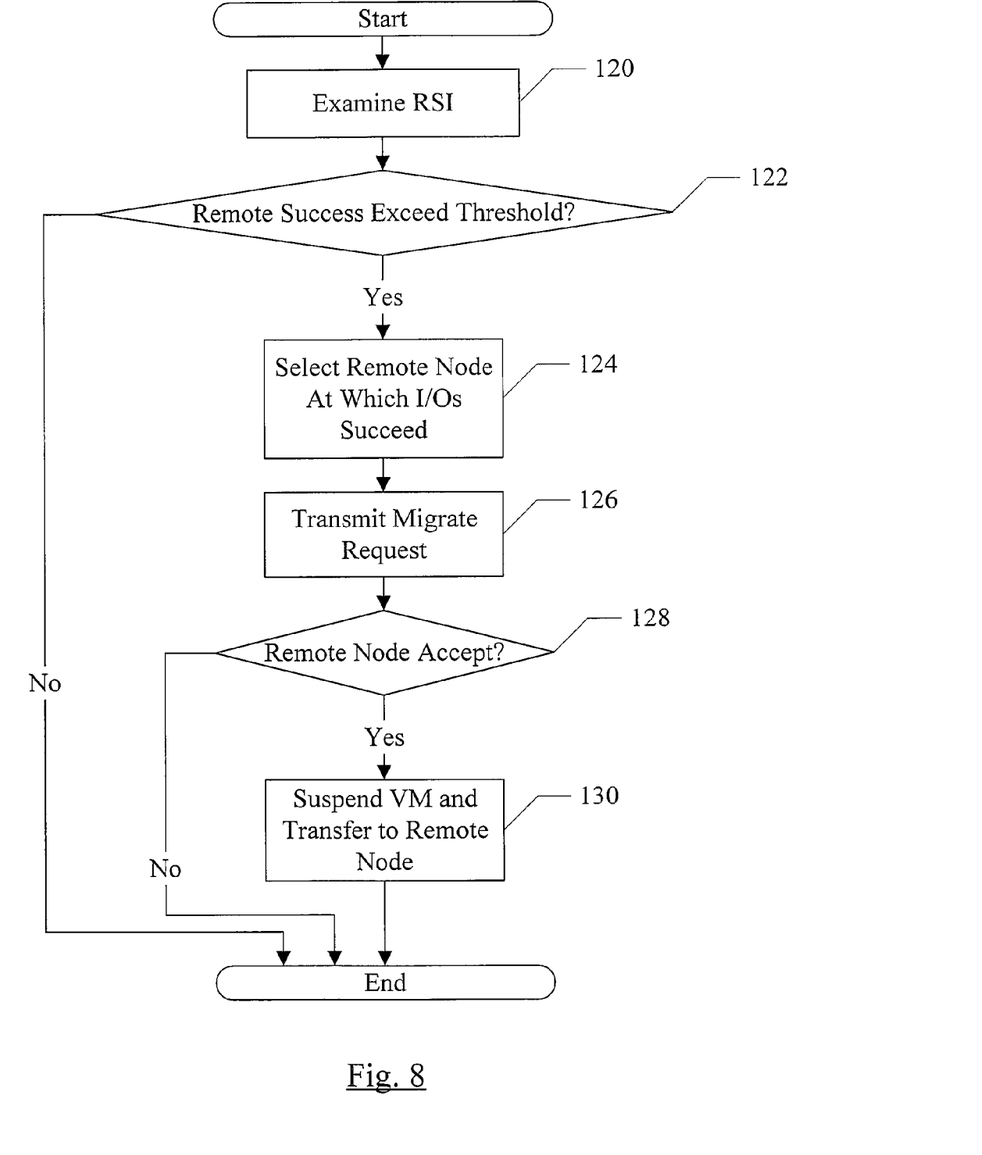
FIG. 8 is a flowchart illustrating operation of one embodiment of storage virtualization component to migrate a virtual machine.

Turning next to FIG. 8, a flowchart is shown illustrating operation of one embodiment of the storage virtualization components 12A-12C to determine if a local application/virtual machine is to be migrated to another node. The flowchart of FIG. 8 may be performed each time a failed local I/O operation is successful on another node, for example. Alternatively or in addition, the flowchart of FIG. 8 may be performed periodically. The storage virtualization component 12A-12C may include instructions which, when executed on the node, implement the operation illustrated in FIG. 8. While blocks are shown in a particular order for ease of understanding, other orders may be used.

The storage virtualization component 12A-12C may examine the RSI to determine if there have been local I/O failures that have been completing successfully on other nodes (block 120). If the RSI exceeds a threshold (decision block 122, "yes" leg), the storage virtualization component 12A-12C may select the node on which the local I/O operations are succeeding (block 124). The storage virtualization component 12A-12C may transmit a migrate request to the selected remote node (block 126). If the remote node accepts the request (decision block 128, "yes" leg), the storage virtualization component may suspend the virtual machine and transfer the virtual machine to the remote node (block 130). Otherwise (decision block 128, "no" leg), the virtual machine may continue executing on the current node.

In general, the determination of whether or not the RSI exceeds a threshold may depend on what data is collected in the RSI. For example, if the RSI includes a count of local I/O operations that have succeeded on another node, the count may be compared to a count threshold. In another embodiment, the RSI may indicate the relative success of the remote node in completing failed local I/O operations (e.g. a percentage of successful completions), and the percentage may be compared to a desired percentage. In general, any measure of success may be accumulated in the RSI and compared to a threshold. The threshold may be fixed or programmable.

Figure 9:
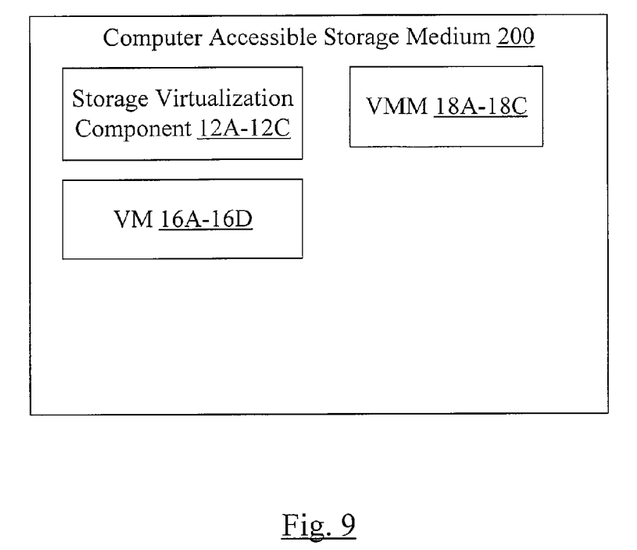
FIG. 9 is a block diagram of one embodiment of a computer accessible medium.

Turning now to FIG. 9, a block diagram of a computer accessible storage medium 200 is shown. Generally speaking, a computer accessible medium may include any media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), etc. The media may be insertable into the computer, integrated into the computer (e.g. a fixed disk or RAM), or coupled to the computer via a communication medium such as a network and/or a wireless link. The computer accessible storage medium 200 in FIG. 9 may store one or more of the storage virtualization components 12A-12C, the VMMs 18A-18C, and/or the virtual machines 16A-16D. In one embodiment, the computer accessible storage medium 12A-12C may store one instance of the storage virtualization component 12A-12C and/or the VMM 18A-18C, and the instance may be loaded onto each node. The storage virtualization components 12A-12C may comprise instructions which, when executed, implement the operation described herein for the storage virtualization components. Generally, the computer accessible storage medium 200 may store any set of instructions which, when executed, implement a portion or all of the flowcharts shown in one or more of FIGS. 6-8 and/or the operation illustrated in the examples of FIGS. 2-5. A carrier medium may include computer accessible storage media as well as transmission media such as wired or wireless transmission.

Figure 10:
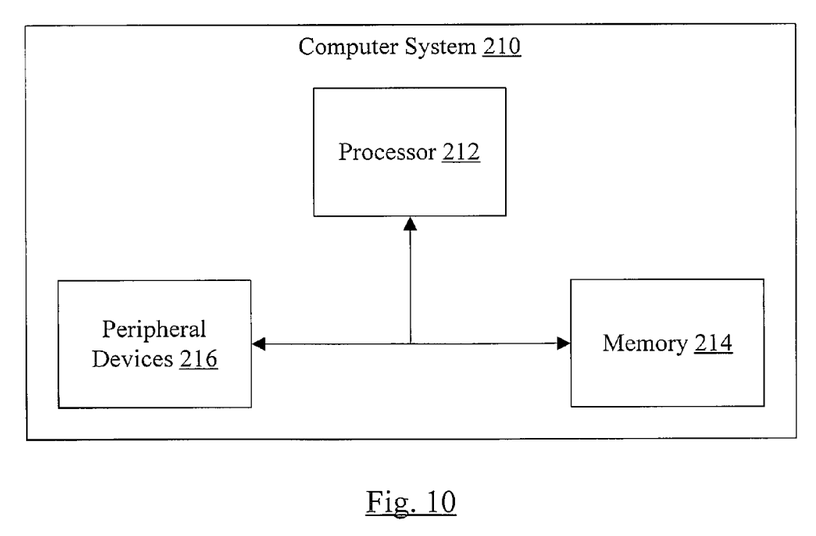
FIG. 10 is a block diagram of one embodiment of a computer system.

FIG. 10 is a block diagram of one embodiment of an exemplary computer system 210. In the embodiment of FIG. 10, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216, creating multiple connections between these components.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use (including the data structures described herein), etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
   transmitting an input/output (I/O) operation for a storage device from a first node of a plurality of nodes, wherein the first node is executing an application that sourced the I/O operation;
   detecting a failure of the I/O operation in a storage virtualization component executing on the first node;
   selecting a second node of the plurality of nodes by the storage virtualization component on the first node responsive to detecting the failure, wherein at least two nodes of the plurality of nodes are available to be selected;
   transmitting the I/O operation from the storage virtualization component on the first node to a storage virtualization component on the second node in response to selecting the second node;
   transmitting the I/O operation from the storage virtualization component on the second node for the storage device;
   detecting that the I/O operation is successful from the second node to the storage Device;
   recording an indication of the success by the storage virtualization component on the first node;
   determining that the indication indicates a migration to the second node; and
   migrating the application to the second node responsive to the determining.

2. The method as recited in claim 1 further comprising:
   transmitting a second I/O operation for the storage device from the first node, wherein the first node is executing a second application that sourced the second I/O operation;
   detecting a failure of the second I/O operation in the storage virtualization component executing on the first node;
   selecting a third node of the plurality of nodes by the storage virtualization component on the first node responsive to detecting the failure, wherein at least two nodes of the plurality of nodes are available to be selected;
   transmitting the second I/O operation from the storage virtualization component on the first node to a storage virtualization component on the third node in response to selecting the second node;
   transmitting the second I/O operation from the storage virtualization component on the third node for the storage device;
   detecting a failure of the second I/O operation transmitted by the third node in the storage virtualization component on the third node;
   selecting a fourth node of the plurality of nodes responsive to detecting the failure;
   transmitting the second I/O operation to a storage virtualization component on the fourth node in response to selecting the fourth node; and
   transmitting the second I/O operation from the storage virtualization component on the fourth node for the storage device.

3. The method as recited in claim 2 wherein selecting the fourth node and transmitting the second I/O operation to the storage virtualization component on the fourth node are performed by the storage virtualization component on the first node.

4. The method as recited in claim 2 wherein selecting the fourth node and transmitting the second I/O operation to the storage virtualization component on the fourth node are performed by the storage virtualization component on the third node.

5. The method as recited in claim 2 further comprising:
   detecting that each available node has been selected and that the second I/O operation has failed from each available node; and
   reporting a failure of the second I/O operation to the second application on the first node in response to detecting that each available node has been selected.

6. The method as recited in claim 5 wherein each node of the plurality of nodes is one of the available nodes.

7. The method as recited in claim 1 wherein the application is executing in a virtual machine, and wherein migrating the application comprises migrating the virtual machine to the second node.

8. The method as recited in claim 1 further comprising:
   reporting to the application on the first node that the I/O operation is complete, responsive to the success.

9. A computer accessible storage medium storing a storage virtualization component which, when executed on a first node of a plurality of nodes:
   transmits an input/output (I/O) operation for a storage device from the first node, wherein the first node is executing an application that sourced the I/O operation;
   detects a failure of the I/O operation;
   transmits the I/O operation to a storage virtualization component on a second node of the plurality of nodes in response to the failure;
   receives a second I/O operation from one of the plurality of nodes;
   transmits the second I/O operation to the storage device;
   detects that the I/O operation is successful from the second node to the storage device;
   records an indication of the success;
   determines that the indication indicates a migration to the second node; and
   migrates the application to the second node responsive to the determining.

10. he computer accessible storage medium as recited in claim 9 wherein the storage virtualization component, when executed on the first node:
    detects a failure of the second I/O operation;
    selects a third node of the plurality of nodes responsive to detecting the failure; and
    transmits the I/O operation to a storage virtualization component on the third node.

11. The computer accessible storage medium as recited in claim 9 wherein the storage virtualization component, when executed on the first node:

detects a failure of the second I/O operation; and reports the failure to the one of the plurality of nodes that transmitted the second I/O operation to the first node.

12. The computer accessible storage medium as recited in claim 9 wherein the storage virtualization component, when executed on the first node:

detects that each available node has been selected and that the I/O operation has failed from each available node; and     reports a failure of the I/O operation to the application responsive to detecting that each available node has been selected and that the I/O operation has failed from each available node.

13. The computer accessible storage medium as recited in claim 9 wherein the application is executing in a virtual machine, and wherein migrating the application from the first node to the second node comprises migrating the virtual machine from the first node to the second node.

14. A method comprising:

transmitting an input/output (I/O) operation for a storage device from a first node of a plurality of nodes, wherein the first node is executing an application that sourced the I/O operation;

detecting a failure of the I/O operation in a storage virtualization component executing on the first node;

selecting a second node of the plurality of nodes by the storage virtualization component on the first node responsive to detecting the failure;

transmitting the I/O operation from the storage virtualization component on the first node to a storage virtualization component on the second node;

responsive to the I/O operation being successful from the second node, migrating the application to the second node;

recording an indication of the success by the storage virtualization component on the first node;

determining that the indication indicates a migration to the second node; and     wherein the migrating is further responsive to the indication.

15. The method as recited in claim 14 further comprising:

transmitting a second I/O operation for the storage device from a third node of a plurality of nodes, wherein the third node is executing a second application that sourced the second I/O operation;

detecting a failure of the second I/O operation in the storage virtualization component executing on the third node;

selecting a fourth node of the plurality of nodes by the storage virtualization component on the third node responsive to detecting the failure;

transmitting the second I/O operation from the storage virtualization component on the third node to the storage virtualization component on the fourth node;

receiving an indication of a failure of the second I/O operation transmitted by the fourth node;

selecting a fifth node of the plurality of nodes responsive to detecting the failure;

transmitting the second I/O operation to a storage virtualization component on the fifth node; and     responsive to the I/O operation being successful from the fifth node, migrating the application to the fifth node.

16. The method as recited in claim 14 further comprising:

transmitting a second I/O operation for the storage device from a third node of a plurality of nodes, wherein the third node is executing a second application that sourced the second I/O operation;

detecting a failure of the second I/O operation in the storage virtualization component executing on the third node;

detecting that each available node has been selected and that the second I/O operation has failed from each available node; and     reporting a failure of the second I/O operation to the second application on the third node.

17. The method as recited in claim 14 wherein the application is executing in a virtual machine, and wherein migrating the application comprises migrating the virtual machine to the second node.

\* \* \* \* \*

UNITED STATES PATENT AND TRADEMARK OFFICE
CERTIFICATE OF CORRECTION

PATENT NO. : 7,886,183 B2  Page 1 of 1
APPLICATION NO. : 12/187859
DATED : February 8, 2011
INVENTOR(S) : Sasidharan Krishnan and Suhas G. Urkude It is certified that error appears in the above-identified patent and that said Letters Patent is hereby corrected as shown below:

In the Claims:

Claim 1, col. 13, line 40, please delete "Device" and insert --device-- in place thereof.

Claim 10, col. 14, line 60, please delete "he" and insert --The-- in place thereof.

Signed and Sealed this
Seventeenth Day of May, 2011

David J. Kappos
*Director of the United States Patent and Trademark Office*